United States Patent Office 2,940,936
Patented June 14, 1960

2,940,936
PREPARING SULFONATED PRODUCTS FROM SULFUR TRIOXIDE

Elmer A. Fike, Nitro, W. Va., assignor to Monsanto Chemical Company, St. Louis, Mo., a corporation of Delaware No Drawing. Filed Apr. 7, 1953, Ser. No. 347,415

8 Claims. (Cl. 252—161)

This invention relates to improvements in the process of sulfonation by means of sulfur trioxide. The invention is especially concerned with the preparation of surface active agents of the organic sulfonate type. A surface active agent is loosely any substance which in small amounts markedly alters the surface behavior of a given system. These include for example the important class of water soluble sulfonates which markedly lower the surface tension in aqueous solution. Thus, this invention is primarily concerned with improvements in the manufacture of wetting agents, detergents, emulsifiers and dispersants comprising high molecular weight organic substances solubilized by sulfonation.

In the process of sulfonation with sulfuric acid or oleum the reaction mixture contains a residue of sulfuric acid. Water is a by-product of the sulfonation so spent acid is inevitable. This spent acid is neutralized along with the sulfonated product when treated with a suitable base, usually sodium hydroxide. While the sodium sulfate by-product is desirable for some purposes, it is distainctly undesirable for others and must be removed. For example, when the use intended for the sulfonated product is in non aqueous systems, the sodium sulfate must be removed. Sodium sulfate is insoluble in petroleum fractions and other organic solvents so that where the sulfonate is to be employed in oil or for the preparation of emulsifiable concentrates of pesticides, the material must be essentially sulfate free.

Use of sulfur trioxide for sulfonation would be expected to overcome the difficulty since no water is formed and no residual acid would be expected. On the other hand the neutralized sulfonation products actually contain sodium sulfate in amounts ranging from 2 to 5%. This is readily demonstrated by treating the neutralized sulfonation product with alcohol and determining the proportion insoluble therein. It appears that while the principal reaction involved is $RH+SO_3=RSO_3H$ where RH represents the organic molecule to be sulfonated, there is a certain proportion of sulfur trioxide combined in some other way. It has been suggested that the following reaction takes place to some extent:

$$RH+2SO_3=RSO_3.SO_3H$$

When the reaction mass containing this complex of sulfur trioxide is treated with caustic soda, the neutralization of the complex would be expected to yield one mole of sodium sulfate per mole of the complex. It will be understood, however, that this invention is not limited to any particular theory of how the formation of inorganic substituents arises.

Among the objects of the present invention are to reduce the inorganic salts formed in the neutralization of the crude sulfonation masses obtained by sulfonation with sulfur trioxide, to utilize more fully the sulfur trioxide for the preparation of useful products, to remove sulfur trioxide combined with the sulfonate, to prepare products suitable for the preparation of aqueous solutions or pastes of high sulfonate concentration, to prepare sulfonated products having low insoluble content in organic solvents and to provide a method of purification of the crude sulfonation mass. Other and further objects will in part be apparent and in part particularly pointed out in the detailed description following.

According to the present invention an alcohol is added to the crude sulfonation mass before neutralization of the sulfonic acid is complete. Especially suitable are primary alcohols. Low molecular weight primary alcohols have the advantage that relatively less is required to reduce the sulfate content whereas high molecular weight primary alcohols have the advantage that they contribute to the active ingredient contained in the final composition. The alcohol may be added to the sulfonation mass immediately after completion of the sulfur trioxide addition or the crude acid may be partially neutralized but the alcohol must be added before neutralization is complete. Treating the sulfonated product, while still acidic, with a primary alcohol reduces the inorganic salt content to an acceptable low level. The time to effect the desired result is reduced by heating. The optimum temperature for the most part has been found to be within the range of 35–65° C.

Although the invention is in nowise limited to any theory of how the alcohol functions to reduce the sulfate content, it appears probable that the alcohol reacts with the aforedescribed complex in accordance with the following equation:

$$RSO_3.SO_3H+R'OH=RSO_3H+R'OSO_3H$$

Neutralization of the resulting mass with sodium hydroxide, for example, would avoid any inorganic salts.

$$RSO_3H+R'OSO_3H+2NaOH=RSO_3Na+R'OSO_3Na+2H_2O$$

In these equations R represents the organic radical involved in the sulfonation and R'OH represents the alcohol. If this view is correct it is apparent that high molecular weight alcohol sulfates may be considered as active ingredient as these comprise a well known class of surface active agents.

The amount of alcohol required is of course a function of its molecular weight and high molecular weight alcohols require a correspondingly higher percentage based on the weight of the crude sulfonation mass. Furthermore, the amount used will also depend upon the objects desired. This may vary from the minimum required to reduce the inorganic sulfate content to an acceptably low figure to high proportions where an object is to prepare mixtures of surface active agents. In the case of the alkyl benzene sodium sulfonates containing 10 to 15 carbon atoms in the side chain, the sodium sulfate content of 2 to 5% corresponds to 0.05 to 0.13 mole of sulfur trioxide per mole of sulfonate. This ratio is apparently constant regardless of the conditions of sulfonation. Expressed as percent by weight on the crude sulfonation mass, usually 0.5 to 3% of the alcohol is sufficient. The amount required in a particular instance may be readily determined by neutralizing a sample of the crude sulfonation mass with sodium hydroxide and determining the proportion of material insoluble in alcohol. From this figure the amount of alcohol required may be readily calculated. In practice it has been usual to use twice the theoretical quantity based on a monosulfate, thereby providing an ample safety factor.

Suitable alcohols include methyl, ethyl, propyl, butyl, amyl, hexyl, heptyl and octyl alcohols, 2-ethyl hexanol, nonyl alcohol, decyl alcohol, undecyl alcohol, lauryl alcohol, ethylene glycol, propylene glycol, glycerine and ether alcohols. Typical suitable examples are diethylene glycol, dipropylene glycol, ethylene glycol mono butyl ether, ethylene glycol mono methyl ether, diethylene glycol mono ethyl ether, diethylene glycol mono methyl ether, 2-ethyl hexane diol-1,3, and tetrahydrofurfuryl alcohol. Excellent results have also been obtained with poly ether alcohols. Suitable examples in this class comprise polyethylene glycol, as for example Carbowax 1500, alcohols of the general structure RO(R$_1$O)$_n$R$_1$OH where RO is the residue remaining after removal of hydrogen from a carbinol substituted heterocyclic radical in which the heterocyclic atom is oxygen or sulfur, R$_1$ is alkylene and $n$ is an integer. Examples are the reaction product of one mole of tetrahydrofurfuryl alcohol and ten moles of ethylene oxide, the reaction product of one mole of furfuryl alcohol and ten moles of ethylene oxide, and the reaction product of one mole of furfuryl alcohol and fifteen moles of ethylene oxide. These and other suitable members of this class are disclosed in my joint co-pending application Serial No. 289,910, filed May 24, 1952, now U.S. Patent No. 2,744,874. Also suitable are condensation products of phenol and ethylene oxide, as for example one mole of phenol condensed with six, eight, ten, twelve, fourteen or sixteen moles of ethylene oxide. These are described in co-pending application of Russell L. Jenkins, Serial No. 299,243, filed July 16, 1952, now U.S. Patent No. 2,742,436. The aforesaid co-pending applications disclosed alcohols which are useful in alkyl benzene sodium sulfonates for reducing the dustiness. Accordingly, this type product can be used with advantage in the sulfonation process as their presence is desirable for other purposes. Examples of other high molecular weight alcohols comprising nonionic synthetic wetting agents and detergents, are the condensation of 100 parts by weight tall oil with 140–210 parts by weight ethylene oxide, the condensation products of octyl, nonyl, decyl, undecyl or dodecyl alcohol with 7 to 15 moles of ethylene oxide per mole of alcohol and the condensation of oleyl alcohol and 10 to 20 moles of ethylene oxide per mole of the alcohol. Still other examples are the condensation products of long chain mercaptans with ethylene oxide, as for example decyl or dodecyl mercaptan condensed with 7 to 15 moles of ethylene oxide per mole of mercaptan.

The invention is particularly applicable to the sulfonation of aromatic compounds although it may be applied to the sulfonation of olefins. Surface active agents are prepared by sulfonation of olefins containing 8 to 30 carbon atoms, the range of 12 to 18 carbon atoms usually being preferred. Thus, surface active agents may be prepared by sulfonation of hexanedecene-1, tetradecene, octadecylene and octadecadiene. However, the mechanism of olefin sulfonation is considerably different than in the aromatic series. Ordinarily 2 moles of sulfur trioxide combine with 1 mole of olefin so that reaction of the crude sulfonation mass with an alcohol would involve a molecular proportion of alcohol at least equal to that of the sulfonate. The invention is primarily intended for sulfonation of alkyl aromatic hydrocarbons, as for example alkyl benzenes, alkyl diphenyls and alkyl naphthalenes. Alkyl benzenes containing 10 to 15 carbon atoms in the side chain are utilized for the preparation of preferentially water soluble sulfonates and those containing 18 to 30 carbon atoms in the side chain are utilized for the preparation of preferentially oil soluble sulfonates. These intermediates include the well known keryl benzenes and alkyl benzenes derived from olefins. Polymers of ethylene, propylene, butylene and amylene are all useful alkylating agents. An alkyl benzene boiling at 105–260° C./5 mm. is suitable for the preparation of a preferentially oil soluble sulfonate. These alkyl benzenes can in turn be prepared by alkylation of benzene with butylene or propylene polymers having boiling points initially of 110° C./5 mm. Alkyl benzenes which give preferentially water soluble sulfonates include alkyl benzene boiling at 250–338° C. at atmospheric pressure prepared from propylene tetramer, alkyl benzene fraction B.P. 109–165° C./2 mm. prepared from propylene tetramer, keryl benzene, B.P. 102–165° C./2 mm. and keryl benzene, B.P. 35–165° C./2 mm.

The following detailed examples illustrate the invention in detail but are to be understood as illustrative only.

*Example 1*

A keryl benzene fraction corresponding essentially to dodecyl benzene was sulfonated by means of sulfur trioxide in the well known manner. 53.6 parts by weight of dodecyl benzene was charged into a sulfonator and 17.5 parts by weight of sulfur trioxide vapor diluted with 52.3 parts by weight of dry air was passed into the stirred mixture while keeping the temperature at 60–70° C. The crude sulfonation mass was then neutralized with 17.4 parts by weight of 50% sodium hydroxide diluted with 12.5 parts by weight of water to produce a composition comprising 75% sodium alkyl benzene sulfonate. Other runs were carried out by adding an alcohol to the crude sulfonation mass before neutralization and stirring for about an hour at 60° C. The results are summarized below:

| Alcohol | Percent by weight on the crude Sulfonation Mass | Percent Alcohol Insolubles in Fnal Product |
| --- | --- | --- |
| None | | 3.0 av. |
| Lauryl alcohol | 2.1 | 2.38 |
| Do | 4.3 | 1.18 |
| Do | 8.5 | 0.84 |
| Do | 12.8 | 0.74 |
| Methanol | 1.5 | 0.76 |
| Glycerol | 2.2 | 0.8 |
| 2-Ethyl hexanol | 6.1 | 1.16 |
| Tall oil-ethylene oxide [1] | 25.6 | 0.86 |

[1] This material was a commercial synthetic detergent alcohol prepared by condensing tall oil with ethylene oxide.

*Example 2*

This example illustrates in detail the preparation of a mixture of a non ionic and a sulfonated detergent, the former being added before neutralization of the latter is complete. Such combinations have outstanding properties for certain uses as described in my joint co-pending application Serial No. 204,688, filed January 5, 1951, now U.S. Patent No. 2,731,338. 21.5 parts by weight of keryl benzene corresponding essentially to dodecyl benzene were charged into a sulfonator of suitable capacity. 7 parts by weight of sulfur trioxide vapor diluted with 12.7 parts by weight of dry air or other diluent in accordance with well known procedures was passed into the sulfonator at such a rate that the temperature of the sulfonation mass rose to 60° C. and remained between 60 and 70° C. The sulfonation mass was then treated with 90% of the quantity of monobutylamine required for neutralization. There was then added 6.5 parts by weight of a commercial synthetic alcohol detergent prepared by condensing 1 mole of tall oil with 11 moles of ethylene oxide. The mixture was stirred for about an hour at 60° C. and the neutralization then completed, a total of about 7.1 parts by weight of monobutylamine being required. It is advantageous to neutralize the crude sulfonation mass partially before adding the alcohol ingredient. Synthetic polyether alcohol detergents normally contain a small proportion of caustic soda. This will react with the free acid ingredient producing water and sodium sulfate, two undesirable ingredients. However, by making the addition after about 90% neutralization but before neutralization is complete, the difficulty is for all practical purposes circumvented.

*Example 3*

Keryl benzene corresponding substantially to decyl benzene was charged into a sulfonator. The charge was 22.4 parts by weight of keryl benzene into which were passed 8.2 parts by weight of sulfur trioxide vapor diluted with 24.9 parts by weight of dry air. The reaction was carried out at 40–55° C. The crude sulfonated mass was then converted to a 30% solution of sodium decyl benzene sulfonate by neutralizing with 16.5 parts by weight of 25% aqueous sodium hydroxide diluted with 52.35 parts by weight of water. Other runs were carried out in exactly the same manner except that 0.6 part by weight of methanol was added to the crude sulfonation mass before neutralization. The mixture containing the methanol was stirred at 60° C. for about an hour and then neutralized as described. The alcohol insolubles contained in the finished product as compared to those present without the alcohol treatment are summarized below:

| Methanol—Percent on crude Sulfonation Mass | Alcohol Insolubles—Percent on Neutralized Reaction Product |
|---|---|
| None | 1.26 |
| 0.6 | 0.20 |
| 0.6 | 0.28 |
| 0.6 | 0.18 |

*Example 4*

A high molecular weight keryl benzene suitable for the preparation of a preferentially oil soluble sulfonate was sulfonated with sulfur trioxide. The exact composition was unknown but believed to comprise essentially an alkyl benzene containing 20 to 24 carbon atoms in one or two alkyl groups. 56.4 parts by weight of keryl benzene was charged to the sulfonator and 18.6 parts by weight of sulfur trioxide diluted with 33.3 parts by weight of dry air passed into the sulfonator at 70–80° C. One part by weight of methyl alcohol was then added, the mixture stirred for about an hour at the temperature employed for the sulfonation and then neutralized with 36.7 parts by weight of 25% caustic soda diluted with 133.3 parts by weight of water. The neutralized mass was then washed with kerosene, the water layer separated and the kerosene solution washed with water, the water layer again separated and the remaining water removed by distillation until the solids content is 50%. The alcohol treatment reduces the sodium sulfate formed, permitting the preparation of clear solutions of the sulfonate in the solvent.

*Example 5*

Into a sulfonator was charged 208 parts by weight of dodecyl benzene boiling at 256–315° C. at atmospheric pressure. This material was prepared from propylene polymer. The batch was sulfonated by passing into the sulfonator 70 parts by weight of sulfur trioxide vapor diluted with 4 to 6 volumes of dry air per volume of sulfur trioxide vapor. The temperature was kept below 50° C. during the sulfonation, about three to three and one-half hours being required to effect the reaction. A sample of the crude sulfonation mass was neutralized with caustic soda solution, dried and the quantity of material insoluble in alcohol determined. On the average the alcohol insolubles were 3%. To the crude sulfonation mass was added 2.7% n-propanol and the mass stirred at 55–60° C. with the alcohol for about 45 minutes. The mixture was then neutralized with 25% aqueous caustic soda to produce a fluid composition containing 67–70% of sodium dodecyl benzene sulfonate. It was found that the treatment with n-propanol not only reduced the sodium sulfate content in the final product but made possible the preparation of fluid compositions containing higher proportions of active ingredient than otherwise possible without gelling.

It is intended to cover all changes and modifications of the examples of the invention herein chosen for purposes of disclosure which do not constitute departures from the spirit and scope of the invention.

What is claimed is:

1. In a process of sulfonating an alkylated aromatic hydrocarbon containing at least ten carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding a primary alcohol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide and completing the neutralization in the presence of the added alcohol.

2. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding a primary alcohol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide and completing the neutralization in the presence of the added alcohol.

3. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding a primary alcohol to the crude sulfonated mass free from uncombined sulfur trioxide before neutralization thereof, the said alcohol being in minor amount not more than twice but at least equivalent to the sodium sulfate content when neutralized with sodium hydroxide, heating and stirring the alcohol mixture and neutralizing in the presence of the added alcohol.

4. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding methyl alcohol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide, heating and stirring the alcohol mixture and neutralizing in the presence of the added alcohol.

5. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding n-propanol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide, heating and stirring the alcohol mixture and neutralizing in the presence of the added alcohol.

6. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding n- butanol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide, heating and stirring the alcohol mixture and neutralizing in the presence of the added alcohol.

7. In the process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding a non ionic polyether alcohol detergent to the crude sulfonated mass free from uncombined sulfur trioxide before neutralization of the sulfonic acid is complete, the said alcohol detergent being in minor amount not more than twice but at least equivalent to the sodium sulfate content when neutralized with sodium hydroxide and completing the neutralization in the presence of the added alcohol detergent.

8. In a process of sulfonating an alkyl benzene containing 10–15 carbon atoms in the side chain with gaseous sulfur trioxide under anhydrous conditions and neutralizing the sulfonic acid so obtained to produce a sulfonate substantially free of sulfate from the base employed for the neutralization, the steps which comprise adding ethylene glycol to the crude sulfonated mass free from uncombined sulfur trioxide before neutralization of the sulfonic acid is complete, the said alcohol being in minor amount not more than twice but at least equivalent to the sodium sulfate content when neutralized with sodium hydroxide, heating and stirring the alcohol mixture and neutralizing in the presence of the added alcohol.

References Cited in the file of this patent
UNITED STATES PATENTS

| | | |
|---|---|---|
| 2,522,518 | Kleinholz et al. | Sept. 19, 1950 |
| 2,529,538 | Henry | Nov. 14, 1950 |
| 2,529,539 | Brod | Nov. 14, 1950 |
| 2,652,427 | Shultz | Sept. 15, 1953 |
| 2,655,530 | Nevison | Oct. 13, 1953 |
| 2,742,435 | Korpi | Apr. 17, 1956 |